US012019563B2

(12) United States Patent
Constable et al.

(10) Patent No.: US 12,019,563 B2
(45) Date of Patent: Jun. 25, 2024

(54) CACHE SET PERMUTATIONS BASED ON GALOIS FIELD OPERATIONS

(71) Applicant: Intel Corporation, Santa Clara, CA (US)

(72) Inventors: Scott Constable, Portland, OR (US); Thomas Unterluggauer, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 760 days.

(21) Appl. No.: 17/032,883

(22) Filed: Sep. 25, 2020

(65) Prior Publication Data

US 2021/0081332 A1     Mar. 18, 2021

(51) Int. Cl.
*G06F 12/14*      (2006.01)
*G06F 12/084*      (2016.01)
*G06F 12/0864*     (2016.01)
*G06F 12/0891*     (2016.01)

(52) U.S. Cl.
CPC ........ *G06F 12/1433* (2013.01); *G06F 12/084* (2013.01); *G06F 12/0864* (2013.01); *G06F 12/0891* (2013.01)

(58) Field of Classification Search
CPC ............... G06F 12/0806; G06F 12/084; G06F 12/0864; G06F 12/0891; G06F 12/0895; G06F 12/1408; G06F 12/1433; G06F 12/1441; G06F 2212/1024; G06F 2212/1052; G06F 2212/6082; G06F 7/523
See application file for complete search history.

(56) References Cited

U.S. PATENT DOCUMENTS 6,469,705 B1 * 10/2002 Belley ................. G06F 12/1045
                                                                   345/557
2018/0295204 A1 * 10/2018 Westphal ............ G06F 12/0862

OTHER PUBLICATIONS

Feldhofer et al., "AES implementation on a grain of sand," IEE Proceedings—Information Security, vol. 152, pp. 13-20, 2005.
Osvik et al., "Cache Attacks and Countermeasures: The Case of AES," Department of Computer Science and Applied Mathematics, Weizmann Institute of Science, Israel, Aug. 14, 2005, 21 pages.
Yarom et al., "FLUSH+RELOAD: A High Resolution, Low Noise, L3 Cache Side-Channel Attack," School of Computer Science, The University of Adelaide, Jul. 18, 2013, 9 pages.

(Continued)

*Primary Examiner* — Aracelis Ruiz
(74) *Attorney, Agent, or Firm* — Jordan IP Law, LLC

(57) ABSTRACT

Systems, apparatuses and methods provide for technology that determines that first data associated with a first security domain is to be stored in a first permutated cache set, where the first permuted cache set is identified based on a permutation function that permutes at least one of a plurality of first cache indexes. The technology further determines that second data associated with a second security domain is to be stored in a second permutated cache set, where the second permuted cache set is identified based on the permutation function. The second permutated cache set may intersect the first permutated cache set at one data cache line to cause an eviction of first data associated with the first security domain from the one data cache line and bypass eviction of data associated with the first security domain from at least one other data cache line of the first permuted cache set.

25 Claims, 9 Drawing Sheets

(56) References Cited

OTHER PUBLICATIONS

Gras et al., "Translation Leak-aside Buffer: Defeating Cache Side-channel Protections with TLB Attacks," 27th USENIX Security Symposium (USENIX Security 18), Baltimore, MD, Aug. 15-17, 2018, p. 955-972.
Liu et al., "CATalyst: Defeating last-level cache side channel attacks in cloud computing," 2016 IEEE International Symposium on High Performance Computer Architecture (HPCA), Barcelona, Spain, 2016, 13 pages.
Kiriansky et al., "DAWG: A Defense Against Cache Timing Attacks in Speculative Execution Processors," Cryptology ePrint Archive: Report 2018/418, 2018, 14 pages.
Shi et al., "Limiting cache-based side-channel in multi-tenant cloud using dynamic page coloring," Parallel Processing Institute, Fudan University, IEEE, 2011, p. 194-199.
Costan et al., "Sanctum: Minimal Hardware Extensions for Strong Software Isolation," MIT CSAIL, 2016, 23 pages.
Gruss et al., "Strong and Efficient Cache Side-Channel Protection using Hardware Transactional Memory," in 26th USENIX Security Symposium (USENIX Security 17), Vancouver, BC, Aug. 16-18, 2017, pp. 217-233.
Werner et al., "ScatterCache: Thwarting Cache Attacks via Cache Set Randomization," in 28th USENIX Security Symposium, Santa Clara, California, USA, Aug. 14-16, 2019, p. 676-692.
Kocher et al., "Spectre Attacks: Exploiting Speculative Execution," arXiv:1801.01203V1, Jan. 3, 2018, 16 pages.

\* cited by examiner

US 12,019,563 B2
CACHE SET PERMUTATIONS BASED ON GALOIS FIELD OPERATIONS

TECHNICAL FIELD

Embodiments generally relate to security domain security enforcement. More particularly, embodiments relate to permuting cache sets in a manner that enhances security and isolation between security domains.

BACKGROUND

Cache-based side-channel attacks (e.g., an unintentional transfer of information through a hardware or software mechanism not specifically designed to transfer information) may compromise security. For example, a malicious entity executing in a first security domain may capture secret information from a legitimate program executing in a second security domain through side channel attacks. Known attacks that exploit data leakage through cache side channels include "Prime+Probe" and "Flush+Reload." In order to execute some of these attacks, malicious security domains may manipulate data caches (e.g., prime cache lines) to ascertain "hints" about the behavior (e.g., accesses) of other security domains to identify privileged information such as keys, password, usernames, etc.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
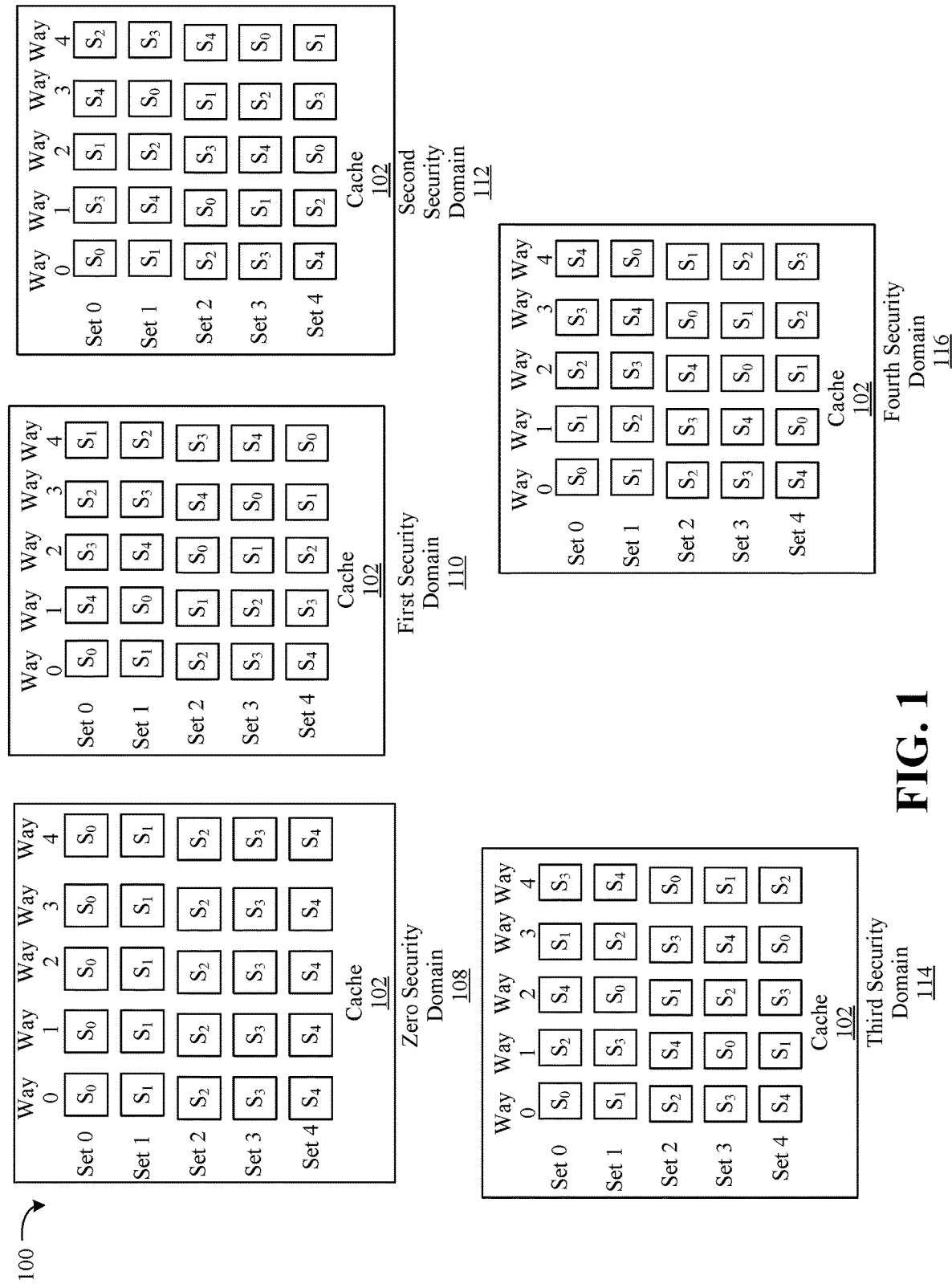
FIG. 1 is an example of a storage schema according to an embodiment.

Turning now to FIG. 1, an exemplary storage schema 100 of storing data in a cache 102 is illustrated. FIG. 1 illustrates the cache 102 as written to by zero-fourth security domain 108, 110, 112, 114, 116 at different times to fill the cache 102. Each of the zero-fourth security domain 108, 110, 112, 114, 116 may share cache 102 to store data in the cache 102.

As will be discussed in further detail below, the zero-fourth security domain 108, 110, 112, 114, 116 may map data to the cache 102 in different ways (e.g., based on Galois-Field arithmetic that may include Galois-Field multiplications and/or Galois-Field additions for example) so that each permuted cache set of each of the zero-fourth security domain 108, 110, 112, 114, 116 intersects every other permuted cache set of every other security domain of the zero-fourth security domain 108, 110, 112, 114, 116 exactly once. In doing so, side-channel attacks may be mitigated.

For example, the first security domain 110 may be unable to practically execute a side-channel attack on any other of the zero, second, third and fourth security domains 108, 112, 114, 116. For example, in a prime+probe attack an entire cache set of a victim security domain may need to be primed by an adversary security domain by loading data into all of the lines of the cache set. The adversary security domain waits for the victim security domain to execute memory accesses. The adversary security domain may then "probe" the cache set by attempting to access the same data that was primed. If a primed cache line was evicted by the victim security domain, then the adversary probe on that line will miss and the probe will require more cycles to complete. The adversary security domain may repeat this attack against strategically chosen cache sets to expose the victim security domain's secrets, for example AES keys.

In contrast, in some embodiments, such attacks may be rendered virtually ineffective. For example, each of the zero-fourth security domain 108, 110, 112, 114, 116 may each be a collection of threads, processes, a virtual machine, an application, etc. that map memory accesses in a different way to the cache 102. For example, cache indexes may be permuted so that each permuted cache set is distributed across physical columns and rows of the cache 102. Thus, in order for any malicious security domain of the zero-fourth security domain 108, 110, 112, 114, 116 to launch a side-channel attack on a victim security domain of the zero-fourth security domain 108, 110, 112, 114, 116, the entire cache 102 would need to be primed in order to ensure that a single permuted cache set of the victim security domain is primed. In doing so, malicious attacks may be rendered virtually useless since the malicious security domain lacks the ability to ascertain specific hints about memory accesses to the cache 102 by the victim security domain to a specific permuted cache set.

In detail, the zero security domain 108 may load the cache 102 with data into permuted cache sets $S_0, S_1, S_2, S_3, S_4$. For example, the zero security domain 108 may generate and/or receive data that includes identification information (e.g., a cache index and a way index). The identification information may be permuted to be mapped to particular physical positions (e.g., cache lines) on the cache 102. For example, the zero security domain 108 and/or the cache 102 may determine that first data associated with execution of the zero security domain 108 is to be mapped to permuted cache set $S_0$ and a particular way (e.g., any of Way 0-Way 4). Further, the zero security domain 108 and/or the cache 102 may determine that second data is to be mapped to permuted cache set $S_1$ and a particular way (e.g., any of Way 0-Way 4). As illustrated, the permuted cache sets $S_0, S_1, S_2, S_3, S_4$ correspond to the physical sets 0-4 of the cache 102 and physical ways 0-4 of the cache 102. In some embodiments, the cache 102 may identify that data associated with the zero security domain 108 is to be stored according to the permuted cache sets $S_0$-$S_4$.

In contrast, the first security domain 110 and/or cache 102 may map data to the data cache lines differently than the zero security domain 108. For example, the permuted cache sets $S_0$, $S_1$, $S_2$, $S_3$, $S_4$ of the first security domain 110 may be differently arranged relative to the permuted cache sets $S_0$, $S_1$, $S_2$, $S_3$, $S_4$ of the zero security domain 108. For example, each of the permuted cache sets $S_0$, $S_1$, $S_2$, $S_3$, $S_4$ of the first security domain 110 may be overlap (e.g., intersect) only once with each of the permuted cache sets $S_0$, $S_1$, $S_2$, $S_3$, $S_4$ of the zero security domain 108 on the physical cache 102.

For example, permuted cache set $S_3$ of the first security domain 110 may overlap with permuted cache set $S_0$ of the of the zero security domain 108 at only one cache line of the cache 102 at physical set 0 of the cache 102 and way 2. Thus, if the first security domain 110 were to store data at permuted set $S_3$ at way 2, data of the zero security domain 108 stored at permuted set $S_0$ and way 2 may be evicted. Similarly, permuted cache set $S_3$ of the first security domain 110 may overlap with permuted cache set $S_1$ of the of the zero security domain 108 at only one data line of the cache 102 at physical set 1 of the cache 102 and way 3. Likewise, permuted cache set $S_3$ of the first security domain 110 may overlap with permuted cache set $S_2$ of the of the zero security domain 108 at only one data line of the cache 102 at physical set 2 of the cache 102 and way 4. Further, permuted cache set $S_3$ of the first security domain 110 may overlap with permuted cache set $S_3$ of the zero security domain 108 at only one data line of the cache 102 at physical set 3 of the cache 102 and way 0. Moreover, permuted cache set $S_3$ of the first security domain 110 may overlap with permuted cache set $S_4$ of the of the zero security domain 108 at only one data line of the cache 102 at physical set 4 of the cache 102 and way 1. Likewise, the other permuted cache sets $S_0$, $S_1$, $S_2$, $S_4$ of the first security domain 110 overlap only once with each of the permuted cache sets $S_0$, $S_1$, $S_2$, $S_3$, $S_4$ of the zero security domain 108. In some embodiments, the first security domain 110 and/or the cache 102 may determine that data associated with execution of the first security domain 108 is to be mapped to permuted cache sets $S_0$, $S_1$, $S_2$, $S_3$, $S_4$ similar to as above.

For example, the first security domain 110 may load the cache 102 with data into permuted cache sets $S_0$, $S_1$, $S_2$, $S_3$, $S_4$. For example, the first security domain 110 may receive data that includes identification information. The identification information may be mapped to the particular positions on the cache 102. For example, the first security domain 110 and/or the cache 102 may determine that the first data associated with execution of the first security domain 110 is to be mapped to permuted cache set $S_0$ and a particular way (e.g., any of Way 0-Way 4). Further, the first security domain 110 and/or the cache 102 may determine that the second data is to be mapped to permuted cache set $S_1$ and a particular way (e.g., any of Way 0-Way 4). As illustrated, each of the permuted cache sets $S_0$, $S_1$, $S_2$, $S_3$, $S_4$ are stored at different physical cache sets (e.g., the permuted cache set $S_0$ extends across physical sets 0-4). In some embodiments, the cache 102 may identify that data associated with the first security domain 110 is to be stored according to the permuted cache sets $S_0$-$S_4$.

Similarly, the second security domain 112 and/or 102 may map data to the data cache lines differently than the zero, first, third and fourth security domains 108, 110, 114, 116. For example, the permuted cache sets $S_0$, $S_1$, $S_2$, $S_3$, $S_4$ of the second security domain 110 may be differently arranged relative to the permuted cache sets $S_0$, $S_1$, $S_2$, $S_3$, $S_4$ of the zero security domain 108 and relative to the permuted cache sets $S_0$, $S_1$, $S_2$, $S_3$, $S_4$ of the first security domain 108. For example, each of the permuted cache sets $S_0$, $S_1$, $S_2$, $S_3$, $S_4$ of the first security domain 110 may be overlap (e.g., intersect) only once with each of the permuted cache sets $S_0$, $S_1$, $S_2$, $S_3$, $S_4$ of the zero security domain 108 and the permuted cache sets $S_0$, $S_1$, $S_2$, $S_3$, $S_4$ of the first security domain 110, etc. similarly to as described above. In some embodiments, the second security domain 112 and/or the cache 102 may determine that data associated with execution of the first security domain 108 is to be mapped to permuted cache sets $S_0$, $S_1$, $S_2$, $S_3$, $S_4$ similar to as above.

Similarly, the third security domain 114 and/or cache 102 may map data to the data cache lines differently than the zero, first, second, and fourth security domains 108, 110, 112, 116. For example, the permuted cache sets $S_0$, $S_1$, $S_2$, $S_3$, $S_4$ of the third security domain 112 may be differently arranged relative to the permuted cache sets $S_0$, $S_1$, $S_2$, $S_3$, $S_4$ of the zero security domain 108, relative to the permuted cache sets $S_0$, $S_1$, $S_2$, $S_3$, $S_4$ of the first security domain 108 and relative to the permuted cache sets $S_0$, $S_1$, $S_2$, $S_3$, $S_4$ of the second security domain 110. For example, each of the permuted cache sets $S_0$, $S_1$, $S_2$, $S_3$, $S_4$ of the third security domain 110 may overlap only once with each of the permuted cache sets $S_0$, $S_1$, $S_2$, $S_3$, $S_4$ of the zero security domain 108, the permuted cache sets $S_0$, $S_1$, $S_2$, $S_3$, $S_4$ of the first security domain 110 and the permuted cache sets $S_0$, $S_1$, $S_2$, $S_3$, $S_4$ of the second security domain 110, etc. similarly to as indicated above. In some embodiments, the third security domain 114 and/or the cache 102 may determine that data associated with execution of the third security domain 114 is to be mapped to permuted cache sets $S_0$, $S_1$, $S_2$, $S_3$, $S_4$ similar to as above.

Similarly, the fourth security domain 116 and/or cache 102 may map data to the data cache lines differently than the zero, first, second and third security domains 108, 110, 112, 114. For example, the permuted cache sets $S_0$, $S_1$, $S_2$, $S_3$, $S_4$ of the fourth security domain 112 may be differently arranged relative to the permuted cache sets $S_0$, $S_1$, $S_2$, $S_3$, $S_4$ of the zero security domain 108, relative to the permuted cache sets $S_0$, $S_1$, $S_2$, $S_3$, $S_4$ of the first security domain 110, relative to the permuted cache sets $S_0$, $S_1$, $S_2$, $S_3$, $S_4$ of the second security domain 112 and relative to the permuted cache sets $S_0$, $S_1$, $S_2$, $S_3$, $S_4$ of the third security domain 114. For example, each of the permuted cache sets $S_0$, $S_1$, $S_2$, $S_3$, $S_4$ of the fourth security domain 116 may overlap only once with each of the permuted cache sets $S_0$, $S_1$, $S_2$, $S_3$, $S_4$ of the zero security domain 108, the permuted cache sets $S_0$, $S_1$, $S_2$, $S_3$, $S_4$ of the first security domain 110, relative to the permuted cache sets $S_0$, $S_1$, $S_2$, $S_3$, $S_4$ of the second security domain 110 and the permuted cache sets $S_0$, $S_1$, $S_2$, $S_3$, $S_4$ of the third security domain 112, similarly to as described above. In some embodiments, the fourth security domain 116 and/or the cache 102 may determine that data associated with execution of the fourth security domain 116 is to be mapped to permuted cache sets $S_0$, $S_1$, $S_2$, $S_3$, $S_4$ similar to as above.

Thus, some embodiments permute cache ways in a manner such that each permuted cache set $S_0$, $S_1$, $S_2$, $S_3$, $S_4$ of each security domain of the zero-fourth security domains 108, 110, 112, 114, 116 intersects every cache set of every other security domain of the zero-fourth security domains 108, 110, 112, 114, 116 exactly once. Such a property may be referred to as a diagonalization of the cache 102.

For example, some embodiments may implement the linear permutation function that to implement the diagonalization property:

$$\Pi(t,s,w) := a \cdot s + b \cdot t \cdot w + c \pmod{R}$$

Function 1

In Function 1, a may be any non-zero constant number, s may be an (input) physical cache set index associated with data to be stored, b may be any non-zero constant, t may be a unique security domain ID assigned to a security domain of the zero-fourth security domains 108, 110, 112, 114, 116 that is storing the data, w is the way index associated with the data, c is any constant, and R is the modulus over a Galois field $GF(p^n)$ where p is prime and n>0. The output of Π is the permuted cache set index for physical cache set index s at the original way w. Thus, the output of Π is the permuted cache index where the data will be stored. For example, one of the zero-fourth security domains 108, 110, 112, 114, 116 may assign a cache set index and way index to data to be stored, and the cache set index may be permuted according Function 1 to be stored in the permuted cache set index. In some embodiments, the calculation of Function 1 above may be efficiently implemented by using hardware implementations, such as XOR gates, accelerators, field-programmable gate arrays, etc.

FIG. 1 illustrates the output of Π for each of the zero-fourth security domains 108, 110, 112, 114, 116 that share the cache 102 with five permuted cache sets $S_0$-$S_4$ and five ways $W_0$-$W_4$ (e.g., p=5, n=1). Each set represents a permuted cache set $S_0$-$S_4$ that has been permuted by function 1 (e.g., Π) above. For example, in the case where n=1, the Galois field GF(p) is of prime order. In such embodiments, the ring of cache set indexes $\mathbb{Z}_p$ may be isomorphic to GF(p). Accordingly, in function 1, each non-zero element $e \in \mathbb{Z}_p$ has a multiplicative inverse: $e^{-1} \in \mathbb{Z}_p$. Furthermore, in some embodiments, arbitrary security domain IDs t and t' (i.e., t≠t') may be assigned, and arbitrary cache set indexes s, s'∈$\mathbb{Z}_p$ may be assigned. In such embodiments, to establish the above property, it may be sufficient to show that for fixed a, b, and c, net, s, =s', w) has a unique solution for w. That is, all cache sets in t and t' intersect along exactly one way. Thus, solving for w is as follows, with the operations being labeled:

$$\Pi(t,s,w)=\Pi(t',s',w) \quad (1)$$

$$a\cdot s+b\cdot t\cdot w+c=a\cdot s'+b\cdot t'\cdot w+c(\text{mod } p) \quad (2)$$

$$b\cdot t\cdot w-b\cdot t'\cdot w=a\cdot s'-a\cdot s(\text{mod } p) \quad (3)$$

$$b\cdot(t-t')\cdot w=a\cdot(s'-s)(\text{mod } p) \quad (4)$$

$$w=a\cdot(s'-s)\cdot b^{-1}\cdot(t-t')^{-1}(\text{mod } p) \quad (5)$$

Operation Listing 1

In the above operation listing 1, operation (2) unfolds Π Operations (3,4) are basic modular arithmetic operations. In operation (5), since b is non-zero it has a multiplicative inverse $b^{-1} \in \mathbb{Z}_p$, and similarly for (t−t') because t≠t'.

Another aspect of function 1 and in particular Π, is that it is a bijection of the cache set indexes within each way. This aspect ensures that each permuted cache sets $S_0$-$S_4$ of zero-fourth security domains 108, 110, 112, 114, 116 do not overlap one another. Thus, this may ensure that each zero-fourth security domains 108, 110, 112, 114, 116 may utilize the entire cache 102 (as opposed to partitioned caches), while reducing frequency of self-evictions.

Further, consider the complementary case where n≠1, and in particular with p=2. Although the ring of cache set indexes $\mathbb{Z}_{2^n}$ may not be isomorphic to $GF(2^n)$, there may be a bijection between two structures. For example, for each i∈ $\mathbb{Z}_{2^n}$, interpret i's sequence of binary digits as the coefficients of a polynomial of degree n−1. Further, cache set index 42=0b00101010 may correspond to the polynomial $x^5+x^3+x$ in $GF(2^8)$. Additions in this field may correspond to XORs of the polynomial coefficients (because the characteristic of the field is 2), and multiplications may be ordinary polynomial multiplications, modulo a reducing polynomial.

The permutation function 1 (e.g., Π) is similarly applicable to other finite fields, and the proof given above for its validity over GF(p) is identical to the argument for the more general case of $GF(p^n)$. The only distinction is that all of the variables and constants may be interpreted as polynomials, and the modulus R may be suitable for $GF(p^n)$ (such a modulus may be guaranteed to exist). Moreover, although it may be possible to implement Π over $GF(p^n)$ for p>2 and n>1, the arithmetic operations necessitate more complicated hardware. Thus, some embodiments may have p=2 (e.g., the number of sets and ways is simply a power of 2).

In some embodiments, a caching structure, such as cache 102, that uses Function 1 (e.g., Π) to permute its $p^n$ cache sets must also have $p^n$ ways, and has the capacity to allow up to $p^n$ distinct security domains to safely share the caching structure. If the cache sets are not equal to the ways, some embodiments may subdivide the cache sets into symmetric blocks and execute the above process independently in each of the blocks.

In some embodiments, the cache 102 may randomly evict cache lines within each permuted cache sets $S_0$-$S_4$ when needed. Further, each cache sets $S_0$-$S_4$ of each of zero-fourth security domain 108, 110, 112, 114, 116 intersects every cache set $S_0$-$S_4$ of every other security domain of the zero-fourth security domain 108, 110, 112, 114, 116 exactly once.

Now consider the effect of a single eviction triggered by an operation within a security domain t which may be any of zero-fourth security domain 108, 110, 112, 114, 116. From the perspective of security domain t, the cache line was evicted from a random way within a single cache set $S_0$-$S_4$. Furthermore from the perspective of any other security domain t' of the zero-fourth security domain 108, 110, 112, 114, 116, a cache line was evicted from a random permuted cache set $S_0$-$S_4$. That is, the security domain t' does not fully understand the outcome of a random eviction within any given cache sets $S_0$-$S_4$ of security domain t. Therefore, security domain t' cannot infer any information from the eviction, other than that some cache line was evicted by security domain t. Thus, security domain t' cannot learn any of the address bits corresponding to the evicted line, which may be the basis for cache-based side-channel attacks such as Prime+Probe, and also for covert-channel attacks.

In some embodiments, a relevant implementation parameter is a latency of the calculating Function 1 or the permutation Π(t, s, w) cache set index as this permutation may need to be computed on every cache request and be embedded into the memory pipeline such as cache 102. To allow for efficient, low-latency implementations of Function 1 and the permutation Π(t, s, w), some embodiments may be instantiated with parameters to reduce latency. For example, the parameters p=2 and n>1, (e.g., the number of sets and ways is a power of 2). In such embodiments, additions are done using bitwise XOR and hence feature very low hardware complexity. In some embodiments, multiplications may be composed of both AND and XOR gates, except for a carefully chosen irreducible polynomial (=modulus R), features a low latency pathway which has been shown before for implementations of Advanced Encryption Standard MixColumns.

For example, for Function 1 (e.g., Π(t, s, w)), consider the scenario where a=1 and b=1. In this case, an implementation of the invention only needs to perform the finite-field multiplications t·w (mod R)∀w. On a high level, these finite-field multiplications may include two parts: a multiplication t·w and a reduction mod R. While generic finite-field multiplications in $GF(2^n)$ may include AND gates to fully execute the multiplication part t·w, the cache architecture, parameters and the set of values for w are fixed at design time of the circuit.

Thus, a circuit performing a multiplication operation "t·w" may not require AND gates but may compute its result by simply XORing shifted instances of the input t, with a maximum latency of n−1 XOR gates. For the reduction part, depending on the output of the multiplication, shifted instances of the irreducible polynomial R may need to be XORed to the multiplication output. Thus, in some embodiments, selecting irreducible polynomials may increase the latency only marginally when compared to plain polynomial multiplication. Table 2 gives an overview on such irreducible polynomials and the respective cache dimensions.

TABLE 2

| Galois Field | Irreducible Polynomial | Cache Dimensions (sets × ways) |
|---|---|---|
| $GF(2^3)$ | $x^3 + x^1 + 1$ | 8 × 8 |
| $GF(2^4)$ | $x^4 + x^1 + 1$ | 16 × 16 |
| $GF(2^5)$ | $x^5 + x^2 + 1$ | 32 × 32 |
| $GF(2^6)$ | $x^6 + x^1 + 1$ | 64 × 64 |
| $GF(2^7)$ | $x^7 + x^1 + 1$ | 128 × 128 |

In some embodiments, implementations may use irreducible polynomials outlined in Table 2 above. For example, consider the degree 4 irreducible polynomial $r(x)=x^4+x^1+1$ and the multiplication of $t(x)=t_3x^3+t_2x^2+t_1+t_0$ and a cache way $w(x)=x^3+x^2+x+1$ in the Galois field $GF(2^4)$. The resulting product $c(x)=c_6x^6+c_5x^5+c_4x^4+c_3x^3+c_2x^2+c_1x+c_0$ before reduction is obtained by XORing the single terms in each column of the following table 3:

TABLE 3

| $x^6$ | $x^5$ | $x^4$ | $x^3$ | $x^2$ | $x^1$ | $x^0$ |
|---|---|---|---|---|---|---|
| $t_3$ | $t_3$ | $t_3$ | $t_3$ | $t_2$ | $t_1$ | $t_0$ |
|  | $t_2$ | $t_2$ | $t_2$ | $t_1$ | $t_0$ |  |
|  |  | $t_1$ | $t_1$ | $t_0$ |  |  |
|  |  |  | $t_0$ |  |  |  |
| $c_6$ | $c_5$ | $c_4$ | $c_3$ | $c_2$ | $c_1$ | $c_0$ |

The polynomial reduction of c(x) may be fixed by the irreducible polynomial, e.g., $r(x)=x^4+x^1+1$. Thus, multiplication and polynomial reduction may be interleaved. Some columns of the multiplication may have results thereof ready earlier, and polynomial reduction may be done with little additional overhead over multiplication by interleaving multiplication and reduction directly in hardware (e.g., accelerators, field-programmable gate arrays, etc.). Some embodiments may provide a reduced multiplication result $\bar{c}(x)=\bar{c}_3x^3+\bar{c}_2x^2+\bar{c}_1x+\bar{c}_0$ in $GF(2^4)$ by again XORing the terms in each column of the following table 4:

TABLE 4

| $x^6$ | $x^5$ | $x^4$ | $x^3$ | $x^2$ | $x^1$ | $x^0$ |
|---|---|---|---|---|---|---|
| $t_3$ | $t_3$ | $t_3$ | $t_3$ | $t_2$ | $t_1$ | $t_0$ |
| $c_6$ | $t_2$ | $t_2$ | $t_2$ | $t_1$ | $t_0$ |  |
|  | $c_5$ | $t_1$ | $t_1$ | $t_0$ | $c_5$ |  |
|  |  | $c_4$ | $t_0$ | $c_5$ | $c_4$ | $c_4$ |
|  |  |  | $c_6$ | $c_6$ |  |  |
|  |  |  | $\bar{c}_3$ | $\bar{c}_2$ | $\bar{c}_1$ | $\bar{c}_0$ |

In this example using the irreducible polynomial $r(x)=x^4+x^1+1$ and $GF(2^4)$, a computational path grows by solely one additional XOR gate compared to plain polynomial multiplication. Thus, the above may demonstrate that careful selection of the irreducible polynomial used for $GF(2^n)$, Function 1 or the permutation Π(t, s, w) used for mapping accesses to cache lines may be efficiently implemented using a small number of XOR gates and hence be embedded with low latency directly into the memory pipeline.

Note that for b #1, the hardware may avoid the multiplication with b by precomputing b·t for each security domain, and keeping the result in dedicated hardware registers and using these precomputed results in the following memory requests. For a constant a≠1, the multiplication a·s (mod R) can be efficiently implemented in the same manner as t·w (mod R). Because a is fixed at design time, the multiplication a·s (mod R) as well features a short critical path consisting of a small number of XOR gates. Note that this multiplication a·s (mod R) may not increase the overall critical path of the permutation Π(t, s, w) as the multiplication can be done in parallel to the multiplications t·w (mod R)∀w.

Figure 2:
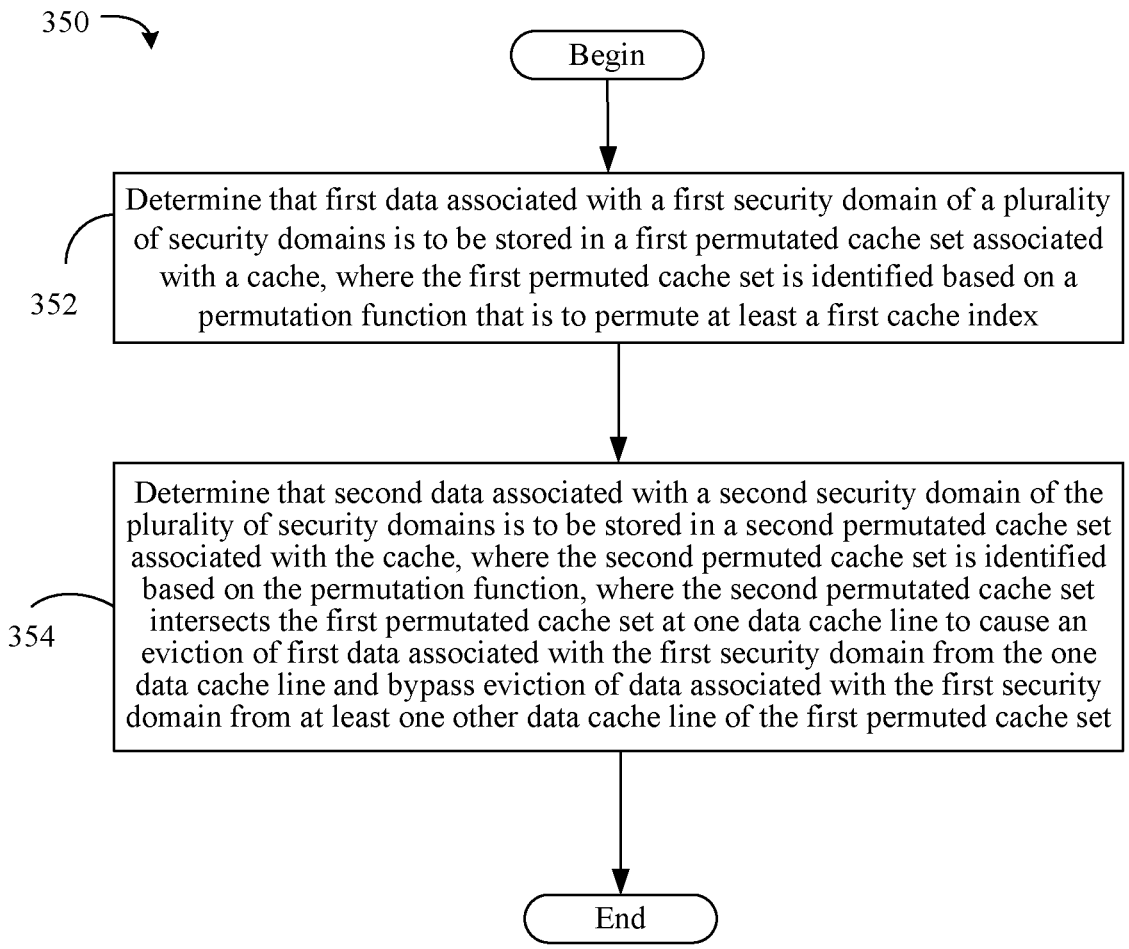
FIG. 2 is a flowchart of an example of a method of security domain enforcement according to an embodiment.

FIG. 2 shows a method 350 of security domain security enforcement. The method 350 may generally be implemented in a cache, host processor and/or security domains, for example, the zero, first, second, third and fourth security domains 108, 110, 112, 114, 116 and cache 102 (FIG. 1), already discussed. In an embodiment, the method 350 is implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 350 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Figure 3:
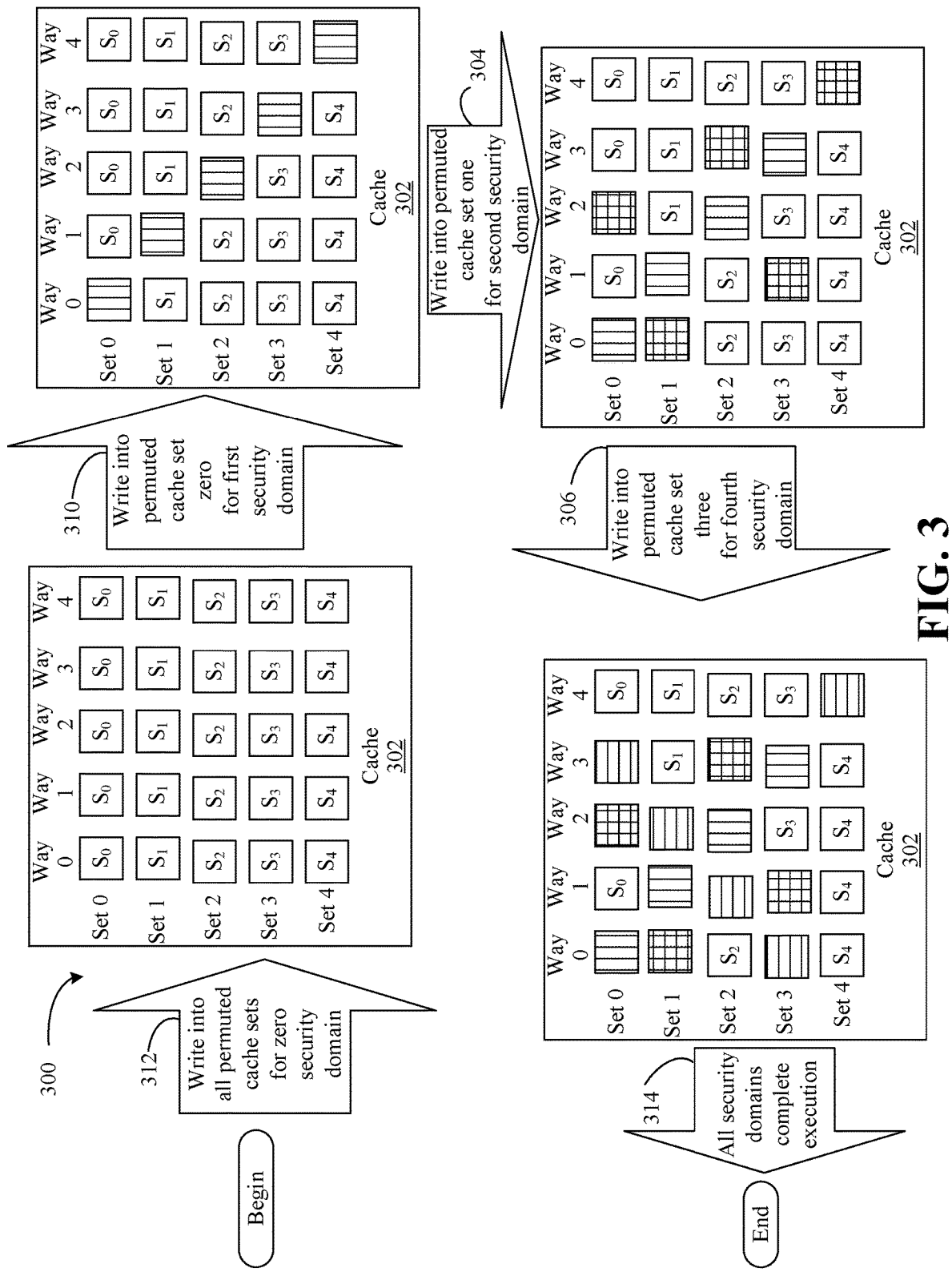
FIG. 3 is a process of an example of implementing cache evictions and storage in a shared cache according to an embodiment.

Illustrated processing block 352 determines that first data associated with a first security domain of a plurality of security domains is to be stored in a first permutated cache set associated with a cache. The first permuted cache set is to be identified based on a permutation function that is to permute at least one of a plurality of first cache indexes. Illustrated processing block 354 determines that second data associated with a second security domain is to be stored in a second permutated cache set associated with the cache. The second permuted cache set is identified based on the permutation function, and the second permutated cache set intersects the first permutated cache set at one data cache line to cause an eviction of first data associated with the first security domain from the one data cache line and bypass eviction of data associated with the first security domain from at least one other data cache line of the first permuted cache set In some embodiments, the method 350 may include determining the first permuted cache set based on a first value associated with the first security domain, and determining the second permuted cache set based on a second value associated with the second security domain. In some embodiments, the method 350 further includes determining the first permuted cache set based on at least one Galois-Field arithmetic operation, and determining the second permuted cache set based on at least one Galois-Field arithmetic operation. The method 350 may further include identifying permuted cache sets for each of the plurality of security domains, where each permuted cache set of each of the plurality of security domains intersects each permuted cache set of every other security domain of the plurality of security domains exactly once. In some embodiments, the first permutated cache set is to correspond to a plurality of cache set indexes of the cache. In some embodiments, the cache is a set-associative cache shared by each of the plurality of security domains FIG. 3 shows a process 300 of implementing cache evictions and storage in a shared cache 302 based on permuted cache indexes. Process 300 may be readily implemented with the storage schema 100 illustrated in FIG. 1. Initially, process 300 may write into all cache sets of the cache 302 for a zero security domain 312. The location of the permuted cache sets $S_0$-$S_4$ are illustrated in cache lines at the intersections of the physical cache locations 0-4 and ways 0-4. For example, zero permuted cache set corresponds to $S_0$, first permuted cache set corresponds to $S_1$, second permuted cache set corresponds to $S_2$, third permuted cache set corresponds to $S_3$ and fourth permuted cache set corresponds to $S_4$. In this example, the zero security domain fills all of the cache lines of the cache 302 with data.

The process 300 further includes writing into cache set zero for the first security domain 310. As already discussed, the first security domain may store data according to a different storage mapping mechanism than the zero security domain. Thus, rather than overwriting and evicting all of the cache lines of $S_0$, the first security domain may instead store data (as shown by the vertically striped lines) over one cache line of each of the permuted cache sets $S_0$-$S_4$ of the zero security domain. Data of the permuted cache sets $S_0$-$S_4$ of the zero security domain may be evicted by the storage of the permuted cache set zero of the first security domain.

The process 300 may further include writing into permuted cache set one for the second security domain 304. As illustrated, the cross-hatched lines represent the second permuted cache set of the second security domain. Data of the permuted cache sets $S_0$-$S_4$ of the zero security domain and the permuted cache set zero of the first security domain may be evicted by the storage of the permuted cache set one of the second security domain.

The process 300 may further include writing into permuted cache set three for the fourth security domain 306. As illustrated, the horizontal lines represent the permuted cache set three of the fourth security domain. Data of the permuted cache sets $S_0$-$S_4$ of the zero security domain, the permuted cache set zero of the first security domain and permuted cache set one of the second security domain may be evicted from the cache 302 by cache set three of the fourth security domain. The process 300 may then complete and all security domains complete execution 314.

Figure 4:
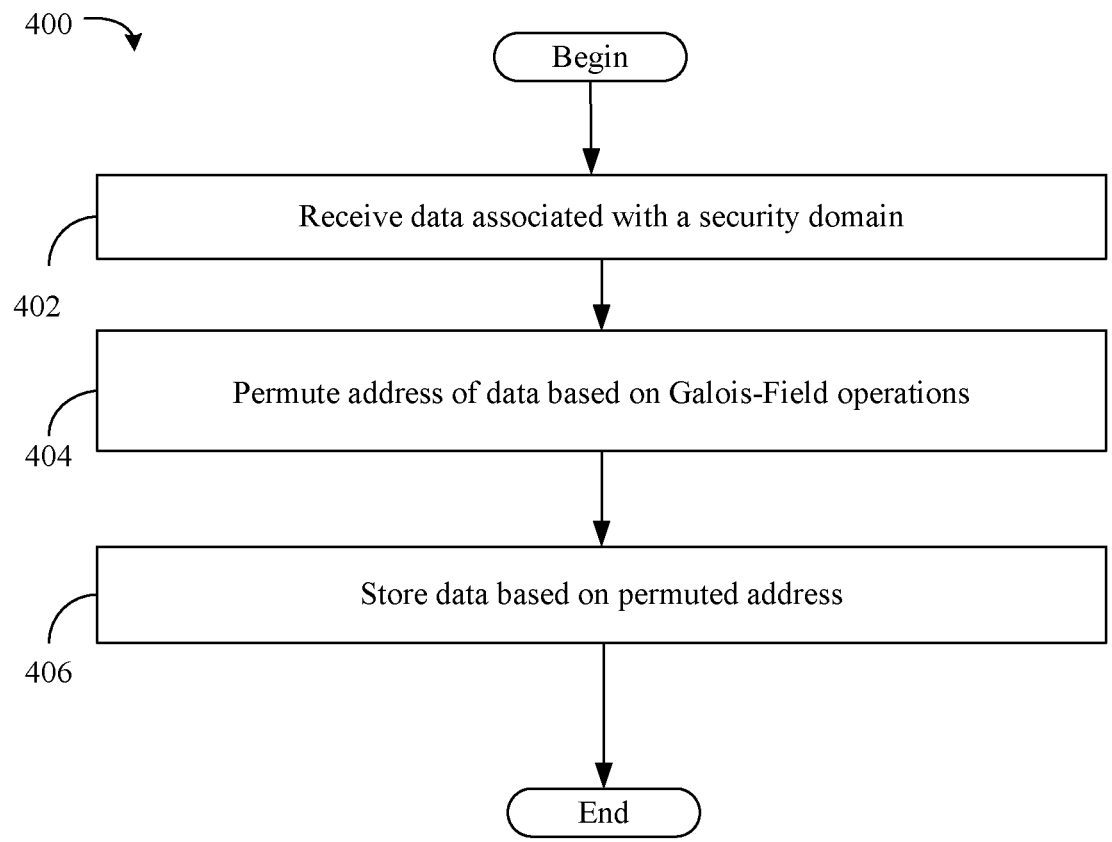
FIG. 4 is a flowchart of an example of a method of storing data according to permuted cache sets according to an embodiment.

FIG. 4 shows a method 400 of storing data according to permuted cache sets. The method 400 may generally be implemented in the storage schema 100 (FIG. 1), method 350 (FIG. 2), and/or process 300 (FIG. 3) already discussed. More particularly, the method 60 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 402 receives data associated with a security domain. Illustrated processing block 404 permutes an address of the data based on Galois-Field operations (e.g., multiplications and/or additions). In some embodiments, processing block 404 may execute with accelerators. Illustrated processing block 406 stores data based on the permuted address.

Figure 5:
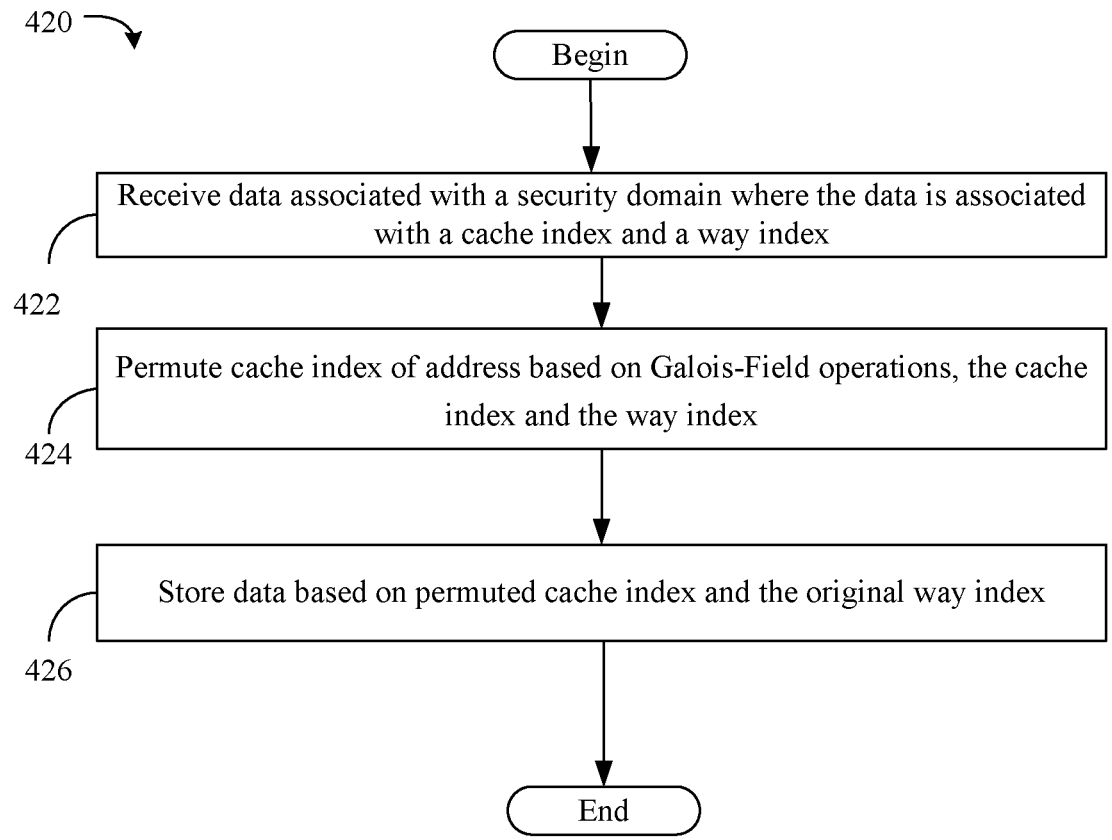
FIG. 5 is a flowchart of an example of a method of storing data according to permuted cache sets based on Galois-Field operations according to an embodiment.

FIG. 5 shows a method 420 of storing data according to permuted cache sets. The method 420 may generally be implemented in the storage schema 100 (FIG. 1), method 350 (FIG. 2), process 300 (FIG. 3) and/or method 400 (FIG. 4), already discussed. More particularly, the method 420 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 422 receives data associated with a security domain where the data is associated with a cache index and a way index. Illustrated processing block 424 permutes the cache index of the address based on Galois-Field Multiplication operations, the cache index and the way index. Illustrated processing block 426 stores data based on the permuted cache index and the original way index.

Figure 6:
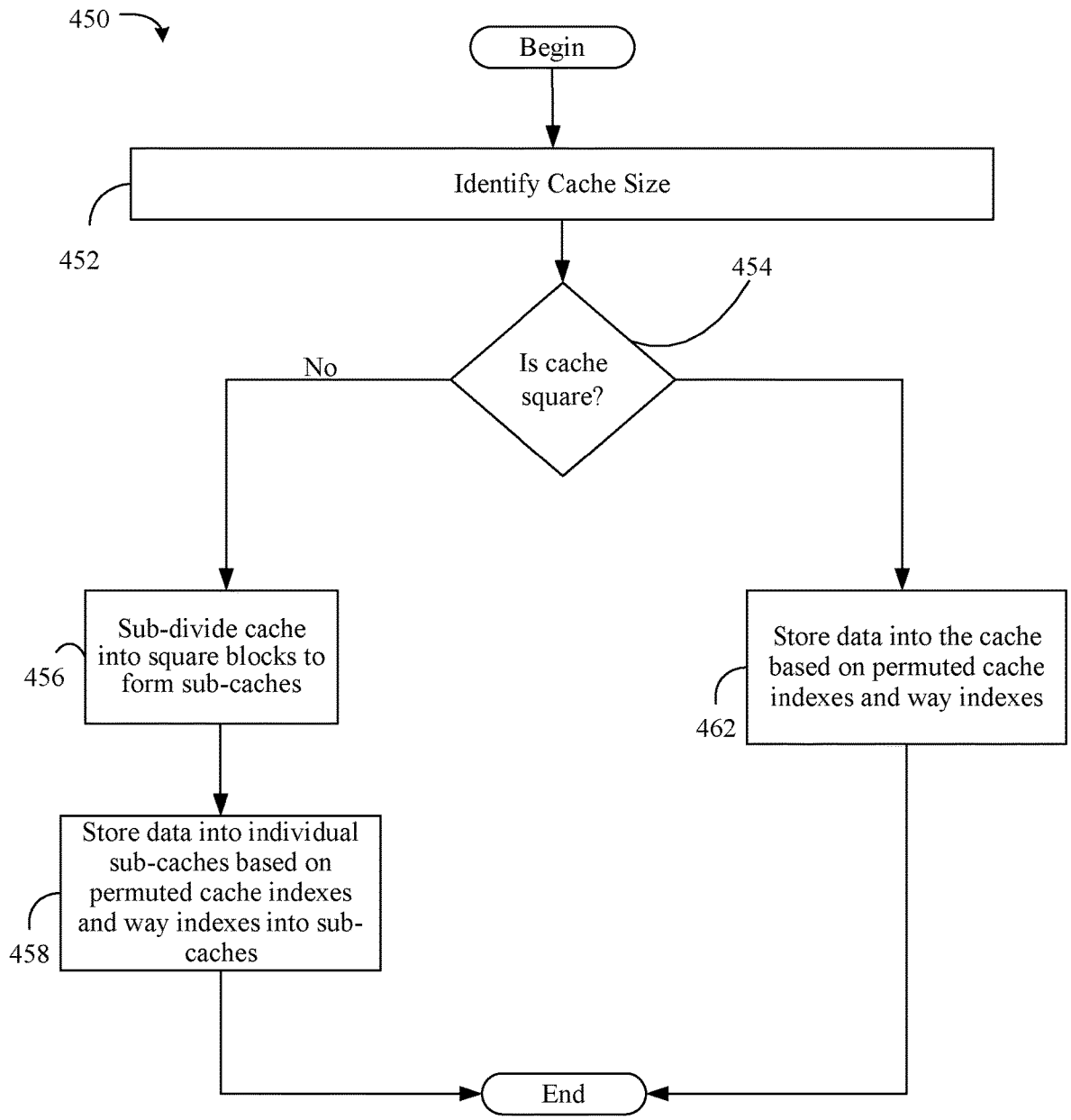
FIG. 6 is a flowchart of an example of a method of subdividing a cache to square sub-caches that employ permuted cache sets according to an embodiment.

FIG. 6 shows a method 450 of subdividing a cache to square sub-caches that employ permuted cache sets. The method 450 may generally be implemented in conjunction with the storage schema 100 (FIG. 1), method 350 (FIG. 2), process 300 (FIG. 3), method 400 (FIG. 4) and/or method 420 (FIG. 5), already discussed. More particularly, the method 450 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

Illustrated processing block 452 identifies a cache size associated with a cache that is to store data. Illustrated processing block 454 determines whether the cache is square (e.g., if the physical number of cache ways equals the physical number of cache sets). If not, illustrated processing block 456 sub-divides the cache into square blocks where the number of cache indexes equals the number of cache ways to form square sub-caches. Illustrated processing block 458 then stores data into individual sub-cache indexes and way indexes into sub-caches. For example, process block 458 may independently store data into each of the sub-caches based on permuted cache indexes. For example, if the cache is being split into several Galois caches, then there may be two steps to determine where to store a given piece of data: (1) choose the Galois cache that will store the data. This may be executed randomly, or by using some of the address bits of the store/load address as an index to select the Galois cache; (2) Once the Galois cache has been selected, use the permutation function to determine the permuted cache set for the data for example as described in method 400 and/or 420 (FIGS. 4 and 5). For example, each of the sub-caches may independently follow the storage schema 100 described in FIG. 1. Otherwise, illustrated processing block 462 stores data into the cache based on permuted cache indexes and way indexes.

As noted, in some embodiments, permutations of caches as described above establishes a diagonalization property when the cache is square (e.g., when the number of sets is equal to the number of ways). However, in some embodiments, some constraints (e.g., power consumption) may constrain a ratio of sets to ways, typically so that the number of sets may be greater than the number of ways. In some embodiments, when a cache has a number of sets that do not equal the number of ways, the cache may be divided into several square sub-caches, each of which has the diagonalization property. For example, according to method 450 a cache with 32 sets and 8 ways may be constructed by composing 4 square sub-caches (each with 8 sets and 8 ways) that individually have the diagonalization property.

Figure 7:
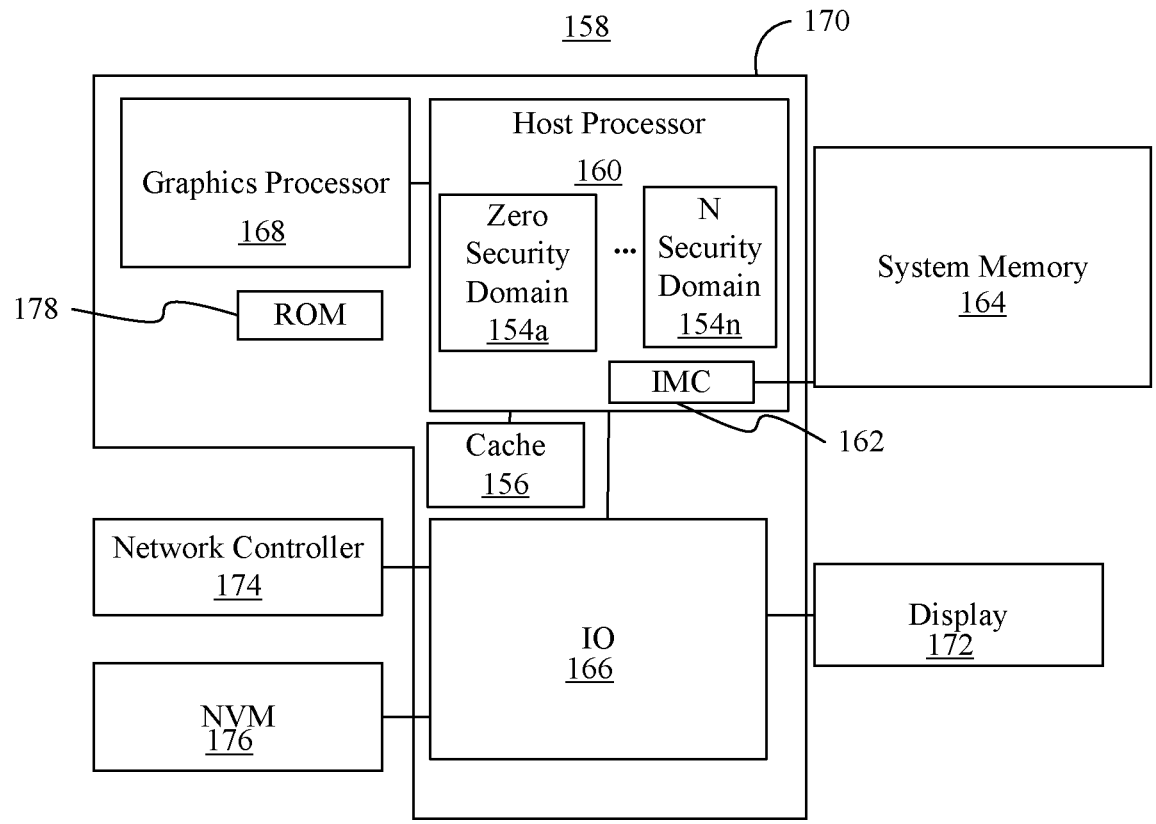
FIG. 7 is a block diagram of an example of a computing system according to an embodiment.

Turning now to FIG. 7, a security-enhanced computing system 158 is shown. The computing system 158 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 158 includes a host processor 160 (e.g., CPU with one or more processor cores) having an integrated memory controller (IMC) 162 that is coupled to a system memory 164.

The illustrated system 158 also includes a graphics processor 168 (e.g., graphics processing unit/GPU) and an input output (IO) module 166 implemented together with the processor 160 (e.g., as microcontrollers) on a semiconductor die 170 as a system on chip (SOC), where the IO module 166 may communicate with, for example, a display 172 (e.g., touch screen, liquid crystal display/LCD, light emitting diode/LED display), a network controller 174 (e.g., wired and/or wireless), and mass storage 176 (e.g., HDD, optical disc, SSD, flash memory or other NVM). The illustrated SOC 170 includes a ROM 178 with logic instructions, which when executed by the host processor 160 and/or graphics processor 168 of the SOC 170, cause the computing system 158 to perform one or more aspects of the storage schema 100 (FIG. 1), method 350 (FIG. 2), the process 300 (FIG. 3), the method 400 (FIG. 4), the method 420 (FIG. 5), the method 450 (FIG. 6), already discussed.

For example, the host processor 160 may provide an execution environment for zero-N security domains 154a-154n. The host processor 160 may store data associated with the zero-N security domains 154a-154n in cache 156 and/or an on-board cache that is on the host processor 160. In order to enhance security, the cache 156, zero-N security domains 154a-154n and/or host processor 160 may store data for each of the zero-N security domains 154a-154n in a different fashion from all others of the zero-N security domains 154a-154n. For example, the zero-N security domains 154a-154n may store data in permuted cache sets as described herein so that each permuted cache set of each of the zero-N security domains 154a-154n intersects every other permuted cache set of the others of the zero-N security domains 154a-154n at most only once. In doing so, the probability of a malicious attack (e.g., a side channel attack) may be mitigated.

For example, the computing system 158 may include a network controller 174 that allows a user to visit websites. A malicious website may begin execution as a security domain of the zero-N security domains 154a-154n and seek to execute a side-channel attack on another of the zero-N security domains 154a-154n. In order to do so, the malicious website would need to effectively set all physical cache sets (e.g., all permuted cache sets) in order to detect accesses by the another security domain. Such an attack is impractical and would yield no useful information, thus, mitigating the possibility of side-channel attacks.

Figure 8:
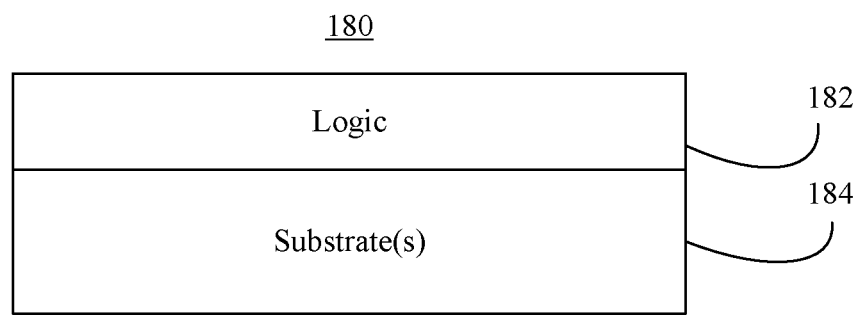
FIG. 8 is an illustration of an example of a semiconductor apparatus according to an embodiment.

FIG. 8 shows a semiconductor package apparatus 180. The illustrated apparatus 180 includes one or more substrates 184 (e.g., silicon, sapphire, gallium arsenide) and logic 182 (e.g., transistor array and other integrated circuit/IC components) coupled to the substrate(s) 184. In one example, the logic 182 is implemented at least partly in configurable logic or fixed-functionality logic hardware. The logic 182 may implement one or more aspects of storage schema 100 (FIG. 1), method 350 (FIG. 2), the process 300 (FIG. 3), the method 400 (FIG. 4), the method 420 (FIG. 5), the method 450 (FIG. 6), already discussed. In one example, the logic 182 includes transistor channel regions that are positioned (e.g., embedded) within the substrate(s) 184. Thus, the interface between the logic 182 and the substrate(s) 184 may not be an abrupt junction. The logic 182 may also be considered to include an epitaxial layer that is grown on an initial wafer of the substrate(s) 184.

Figure 9:
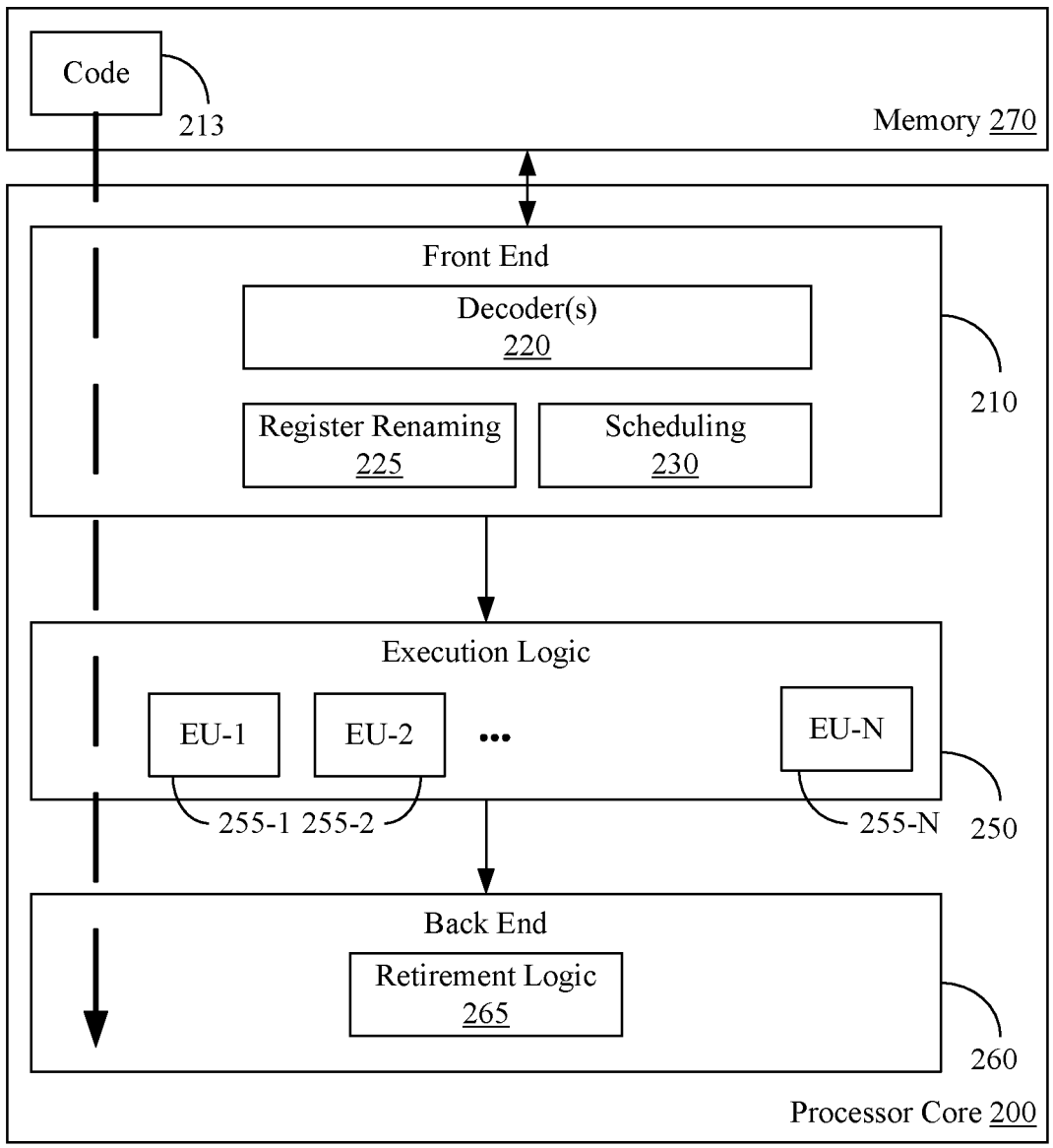
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement storing schema 100 (FIG. 1), method 350 (FIG. 2), the process 300 (FIG. 3), the method 400 (FIG. 4), the method 420 (FIG. 5), the method 450 (FIG. 6), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
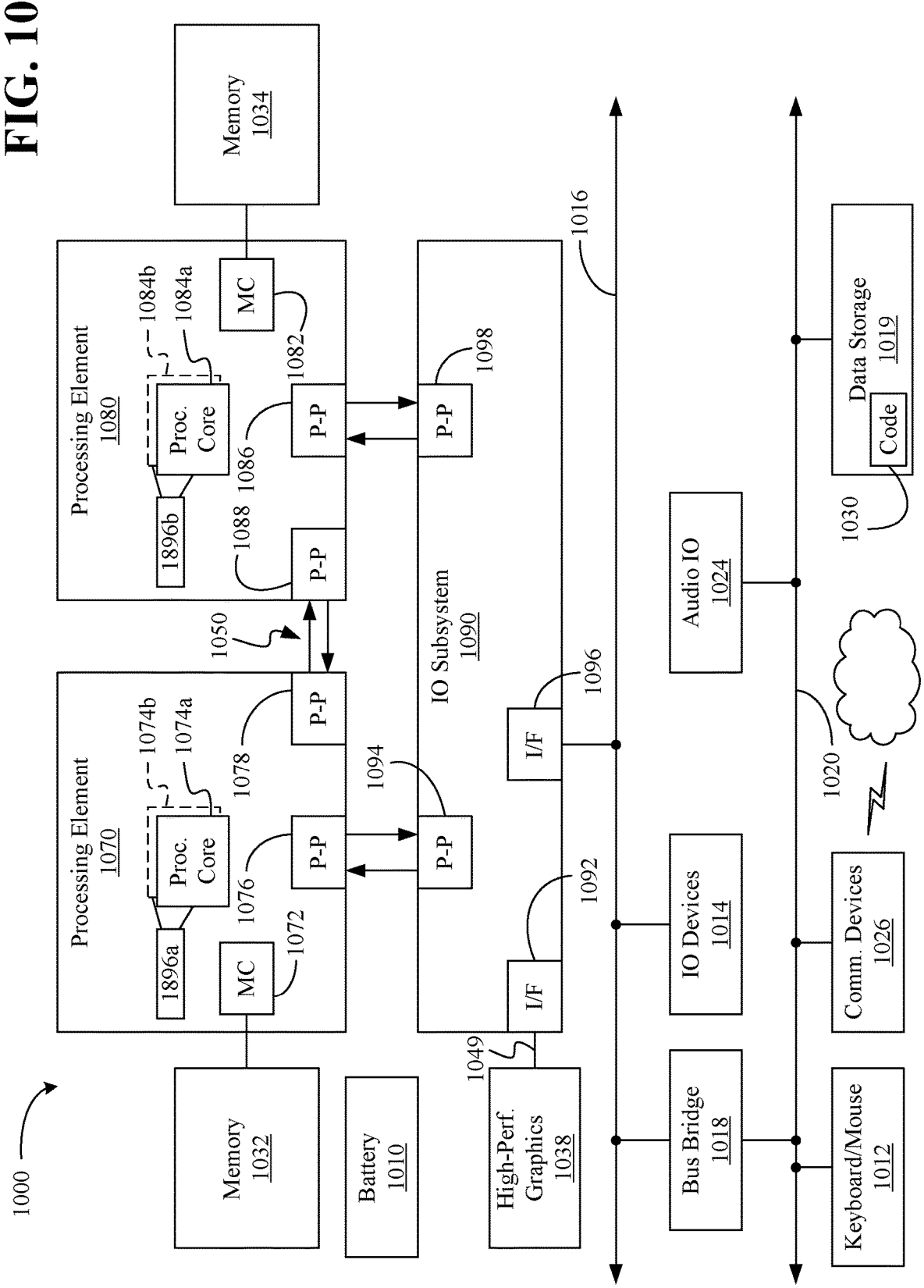
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the storing schema 100 (FIG. 1), method 350 (FIG. 2), the process 300 (FIG. 3), the method 400 (FIG. 4), the method 420 (FIG. 5), the method 450 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

ADDITIONAL NOTES AND EXAMPLES

Example 1 includes a computing system comprising a processor to be associated with execution of a plurality of security domains including a first security domain and a second security domain, and a cache to store data associated with the execution of the plurality of security domains, and a memory including a set of executable program instructions, which when executed by the processor, cause the computing system to determine that first data associated with the first security domain is to be stored in a first permutated cache set associated with the cache, wherein the first permuted cache set is to be identified based on a permutation function that is to permute at least one of a plurality of first cache indexes, and determine that second data associated with the second security domain is to be stored in a second permutated cache set associated with the cache, wherein the second permuted cache set is to be identified based on the permutation function, and wherein the second permutated cache set intersects the first permutated cache set at one data cache line to cause an eviction of first data associated with the first security domain from the one data cache line and bypass eviction of data associated with the first security domain from at least one other data cache line of the first permuted cache set.

Example 2 includes the computing system of example 1, wherein the instructions, when executed, further cause the computing system to determine the first permuted cache set based on a first value associated with the first security domain, and determine the second permuted cache set based on a second value associated with the second security domain.

Example 3 includes the computing system of example 1, wherein the instructions, when executed, further cause the computing system to determine the first permuted cache set based on at least on one Galois-Field arithmetic operation, and determine the second permuted cache set based on at least on one Galois-Field arithmetic operation.

Example 4 includes the computing system of example 1, wherein the instructions, when executed, further cause the computing system to identify permuted cache sets for each of the plurality of security domains, wherein each permuted cache set of each of the plurality of security domains intersects each permuted cache set of every other security domain of the plurality of security domains exactly once.

Example 5 includes the computing system of any one of examples 1 to 4, wherein the first permutated cache set is to correspond to a plurality of cache set indexes.

Example 6 includes the computing system of any one of examples 1 to 4, wherein the cache is to be a set-associative cache shared by each of the plurality of security domains.

Example 7 includes a semiconductor apparatus comprising one or more substrates, logic coupled to the one or more substrates, wherein the logic is implemented at least partly in one or more of configurable logic or fixed-functionality logic hardware, the logic coupled to the one or more substrates to determine that first data associated with a first security domain of a plurality of security domains is to be stored in a first permutated cache set associated with a cache, wherein the first permuted cache set is to be identified based on a permutation function that is to permute at least one of a plurality of first cache indexes, and determine that second data associated with a second security domain of the plurality of security domains is to be stored in a second permutated cache set associated with the cache, wherein the second permuted cache set is to be identified based on the permutation function, and wherein the second permutated cache set intersects the first permutated cache set at one data cache line to cause an eviction of first data associated with the first security domain from the one data cache line and bypass eviction of data associated with the first security domain from at least one other data cache line of the first permuted cache set.

Example 8 includes the apparatus of example 7, wherein the logic coupled to the one or more substrates is to determine the first permuted cache set based on a first value associated with the first security domain, and determine the second permuted cache set based on a second value associated with the second security domain.

Example 9 includes the apparatus of example 7, wherein the logic coupled to the one or more substrates is to determine the first permuted cache set based on at least on one Galois-Field arithmetic operation, and determine the second permuted cache set based on at least on one Galois-Field arithmetic operation.

Example 10 includes the apparatus of example 7, wherein the logic coupled to the one or more substrates is to identify permuted cache sets for each of the plurality of security domains, wherein each permuted cache set of each of the plurality of security domains intersects each permuted cache set of every other security domain of the plurality of security domains exactly once.

Example 11 includes the apparatus of any one of examples 7 to 10, wherein the first permutated cache set is to correspond to a plurality of cache set indexes of the cache.

Example 12 includes the apparatus of any one of examples 7 to 10, wherein the cache is to be a set-associative cache shared by each of the plurality of security domains.

Example 13 includes the apparatus of any one of examples 7 to 10, wherein the logic coupled to the one or more substrates includes transistor channel regions that are positioned within the one or more substrates.

Example 14 includes at least one computer readable storage medium comprising a set of instructions, which when executed by a computing device, cause the computing device to determine that first data associated with a first security domain of a plurality of security domains is to be stored in a first permutated cache set associated with a cache, wherein the first permuted cache set is to be identified based on a permutation function that is to permute at least one of a plurality of first cache indexes, and determine that second data associated with a second security domain is to be stored in a second permutated cache set associated with the cache, wherein the second permuted cache set is to be identified based on the permutation function, and wherein the second permutated cache set intersects the first permutated cache set at one data cache line to cause an eviction of first data associated with the first security domain from the one data cache line and bypass eviction of data associated with the first security domain from at least one other data cache line of the first permuted cache set.

Example 15 includes the at least one computer readable storage medium of example 14, wherein the instructions, when executed, cause the computing device to determine the first permuted cache set based on a first value associated with the first security domain, and determine the second permuted cache set based on a second value associated with the second security domain.

Example 16 includes the at least one computer readable storage medium of example 14, wherein the instructions, when executed, cause the computing device to determine the first permuted cache set based on at least on one Galois-Field arithmetic operation, and determine the second permuted cache set based on at least on one Galois-Field arithmetic operation.

Example 17 includes the at least one computer readable storage medium of example 14, wherein the instructions, when executed, cause the computing device to identify permuted cache sets for each of the plurality of security domains, wherein each permuted cache set of each of the plurality of security domains intersects each permuted cache set of every other security domain of the plurality of security domains exactly once.

Example 18 includes the at least one computer readable storage medium of any one of examples 14 to 17, wherein the first permutated cache set is to correspond to a plurality of cache set indexes of the cache.

Example 19 includes the at least one computer readable storage medium of any one of examples 14 to 17, wherein the cache is to be a set-associative cache shared by each of the plurality of security domains.

Example 20 includes a method comprising determining that first data associated with a first security domain of a plurality of security domains is to be stored in a first permutated cache set associated with a cache, wherein the first permuted cache set is identified based on a permutation function that is to permute at least one of a plurality of first cache indexes, and determining that second data associated with a second security domain of the plurality of security domains is to be stored in a second permutated cache set associated with the cache, wherein the second permuted cache set is identified based on the permutation function, and wherein the second permutated cache set intersects the first permutated cache set at one data cache line to cause an eviction of first data associated with the first security domain from the one data cache line and bypass eviction of data associated with the first security domain from at least one other data cache line of the first permutated cache set.

Example 21 includes the method of example 20, further comprising determining the first permuted cache set based on a first value associated with the first security domain, and determining the second permuted cache set based on a second value associated with the second security domain.

Example 22 includes the method of example 20, further comprising determining the first permuted cache set based on at least on one Galois-Field arithmetic operation, and determining the second permuted cache set based on at least on one Galois-Field arithmetic operation.

Example 23 includes the method of example 20, further comprising identifying permuted cache sets for each of the plurality of security domains, wherein each permuted cache set of each of the plurality of security domains intersects each permuted cache set of every other security domain of the plurality of security domains exactly once.

Example 24 includes the method of any one of examples 20 to 23, wherein the first permutated cache set is to correspond to a plurality of cache set indexes of the cache.

Example 25 includes the method of any one of examples 20 to 23, wherein the cache is a set-associative cache shared by each of the plurality of security domains.

Example 26 includes a semiconductor apparatus comprising means for determining that first data associated with a first security domain of a plurality of security domains is to be stored in a first permutated cache set associated with a cache, wherein the first permuted cache set is identified based on a permutation function that is to permute at least one of a plurality of first cache indexes, and means for determining that second data associated with a second security domain of the plurality of security domains is to be stored in a second permutated cache set associated with the cache, wherein the second permuted cache set is identified based on the permutation function, and wherein the second permutated cache set intersects the first permutated cache set at one data cache line to cause an eviction of first data associated with the first security domain from the one data cache line and bypass eviction of data associated with the first security domain from at least one other data cache line of the first permutated cache set.

Example 27 includes the apparatus of example 26, further comprising means for determining the first permuted cache set based on a first value associated with the first security domain, and means for determining the second permuted cache set based on a second value associated with the second security domain.

Example 28 includes the apparatus of example 26, further comprising means for determining the first permuted cache set based on at least on one Galois-Field arithmetic operation, and means for determining the second permuted cache set based on at least on one Galois-Field arithmetic operation.

Example 29 includes the apparatus of example 26, further comprising means for identifying permuted cache sets for each of the plurality of security domains, wherein each permuted cache set of each of the plurality of security domains intersects each permuted cache set of every other security domain of the plurality of security domains exactly once.

Example 30 includes the apparatus of any one of examples 26 to 29, wherein the first permutated cache set is to correspond to a plurality of cache set indexes of the cache.

Example 31 includes the apparatus of any one of examples 26 to 29, wherein the cache is a set-associative cache shared by each of the plurality of security domains.

Thus, technology described herein may support security domain enforcement and storage. The technology may also enhance security, while also being scalable to operate with different cache sizes and different security domains. Additionally, the technology described herein may mitigate side channel attacks and/or covert channels that may otherwise transmit secrets to an adversarial program.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SOCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
    a processor to be associated with execution of a plurality of security domains including a first security domain and a second security domain; and
    a cache to store data associated with the execution of the plurality of security domains; and
    a memory including a set of executable program instructions, which when executed by the processor, cause the computing system to:
        determine that first data associated with the first security domain is to be stored in a first permuted cache set associated with the cache, wherein the first permuted cache set is to be identified based on a permutation function that is to permute at least one of a plurality of first cache indexes; and
        determine that second data associated with the second security domain is to be stored in a second permuted cache set associated with the cache, wherein the second permuted cache set is to be identified based on the permutation function, and wherein the second permuted cache set intersects the first permuted cache set at one data cache line to cause an eviction of one data of the first data associated with the first security domain from the one data cache line and bypass eviction of at least one other data of the first data associated with the first security domain from at least one other data cache line of the first permuted cache set.

2. The computing system of claim 1, wherein the instructions, when executed, further cause the computing system to:
    determine the first permuted cache set based on a first value associated with the first security domain; and
    determine the second permuted cache set based on a second value associated with the second security domain.

3. The computing system of claim 1, wherein the instructions, when executed, further cause the computing system to
    determine the first permuted cache set based on at least on one Galois-Field arithmetic operation; and
    determine the second permuted cache set based on at least on one Galois-Field arithmetic operation.

4. The computing system of claim 1, wherein the instructions, when executed, further cause the computing system to:
    identify permuted cache sets for each of the plurality of security domains, wherein each permuted cache set of each of the plurality of security domains intersects each permuted cache set of every other security domain of the plurality of security domains exactly once.

5. The computing system of claim 1, wherein the first permuted cache set is to correspond to a plurality of cache set indexes.

6. The computing system of claim 1, wherein the cache is to be a set-associative cache shared by each of the plurality of security domains.

7. A semiconductor apparatus comprising:
    one or more substrates;
    logic coupled to the one or more substrates, wherein the logic is implemented at least partly in one or more of configurable logic or fixed-functionality logic hardware, the logic coupled to the one or more substrates to:
        determine that first data associated with a first security domain of a plurality of security domains is to be stored in a first permuted cache set associated with a cache, wherein the first permuted cache set is to be identified based on a permutation function that is to permute at least one of a plurality of first cache indexes; and
        determine that second data associated with a second security domain of the plurality of security domains is to be stored in a second permuted cache set associated with the cache, wherein the second permuted cache set is to be identified based on the permutation function, and wherein the second permuted cache set intersects the first permuted cache set at one data cache line to cause an eviction of one data of the first data associated with the first security domain from the one data cache line and bypass eviction of at least one other data of the first data associated with the first security domain from at least one other data cache line of the first permuted cache set.

8. The apparatus of claim 7, wherein the logic coupled to the one or more substrates is to:
    determine the first permuted cache set based on a first value associated with the first security domain; and
    determine the second permuted cache set based on a second value associated with the second security domain.

9. The apparatus of claim 7, wherein the logic coupled to the one or more substrates is to:
    determine the first permuted cache set based on at least on one Galois-Field arithmetic operation; and
    determine the second permuted cache set based on at least on one Galois-Field arithmetic operation.

10. The apparatus of claim 7, wherein the logic coupled to the one or more substrates is to:
identify permuted cache sets for each of the plurality of security domains, wherein each permuted cache set of each of the plurality of security domains intersects each permuted cache set of every other security domain of the plurality of security domains exactly once.

11. The apparatus of claim 7, wherein the first permuted cache set is to correspond to a plurality of cache set indexes of the cache.

12. The apparatus of claim 7, wherein the cache is to be a set-associative cache shared by each of the plurality of security domains.

13. The apparatus of claim 7, wherein the logic coupled to the one or more substrates includes transistor channel regions that are positioned within the one or more substrates.

14. At least one non-transitory computer readable storage medium comprising a set of instructions, which when executed by a computing device, cause the computing device to:
determine that first data associated with a first security domain of a plurality of security domains is to be stored in a first permuted cache set associated with a cache, wherein the first permuted cache set is to be identified based on a permutation function that is to permute at least one of a plurality of first cache indexes; and
determine that second data associated with a second security domain is to be stored in a second permuted cache set associated with the cache, wherein the second permuted cache set is to be identified based on the permutation function, and wherein the second permuted cache set intersects the first permuted cache set at one data cache line to cause an eviction of one data of the first data associated with the first security domain from the one data cache line and bypass eviction of at least one other data of the first data associated with the first security domain from at least one other data cache line of the first permuted cache set.

15. The at least one non-transitory computer readable storage medium of claim 14, wherein the instructions, when executed, cause the computing device to:
determine the first permuted cache set based on a first value associated with the first security domain; and
determine the second permuted cache set based on a second value associated with the second security domain.

16. The at least one non-transitory computer readable storage medium of claim 14, wherein the instructions, when executed, cause the computing device to:
determine the first permuted cache set based on at least on one Galois-Field arithmetic operation; and
determine the second permuted cache set based on at least on one Galois-Field arithmetic operation.

17. The at least one non-transitory computer readable storage medium of claim 14, wherein the instructions, when executed, cause the computing device to:
identify permuted cache sets for each of the plurality of security domains, wherein each permuted cache set of each of the plurality of security domains intersects each permuted cache set of every other security domain of the plurality of security domains exactly once.

18. The at least one non-transitory computer readable storage medium of claim 14, wherein the first permuted cache set is to correspond to a plurality of cache set indexes of the cache.

19. The at least one non-transitory computer readable storage medium of claim 14, wherein the cache is to be a set-associative cache shared by each of the plurality of security domains.

20. A method comprising:
determining that first data associated with a first security domain of a plurality of security domains is to be stored in a first permuted cache set associated with a cache, wherein the first permuted cache set is identified based on a permutation function that is to permute at least one of a plurality of first cache indexes; and
determining that second data associated with a second security domain of the plurality of security domains is to be stored in a second permuted cache set associated with the cache, wherein the second permuted cache set is identified based on the permutation function, and wherein the second permuted cache set intersects the first permuted cache set at one data cache line to cause an eviction of one data of the first data associated with the first security domain from the one data cache line and bypass eviction of at least one other data of the first data associated with the first security domain from at least one other data cache line of the first permuted cache set.

21. The method of claim 20, further comprising:
determining the first permuted cache set based on a first value associated with the first security domain; and
determining the second permuted cache set based on a second value associated with the second security domain.

22. The method of claim 20, further comprising:
determining the first permuted cache set based on at least on one Galois-Field arithmetic operation; and
determining the second permuted cache set based on at least on one Galois-Field arithmetic operation.

23. The method of claim 20, further comprising:
identifying permuted cache sets for each of the plurality of security domains, wherein each permuted cache set of each of the plurality of security domains intersects each permuted cache set of every other security domain of the plurality of security domains exactly once.

24. The method of claim 20, wherein the first permuted cache set is to correspond to a plurality of cache set indexes of the cache.

25. The method of claim 20, wherein the cache is a set-associative cache shared by each of the plurality of security domains.

* * * * *